United States Patent [19]
Ishikawa et al.

[11] Patent Number: 5,843,204
[45] Date of Patent: Dec. 1, 1998

[54] METHOD FOR RECYCLING IRON AND STEEL INDUSTRY WASTE

[75] Inventors: Yoshitaka Ishikawa, Chiba; Susumu Ide, Tokyo; Toshio Matsuoka; Shinichi Kurozu, both of Ehime; Hiroshi Koide, Wakayama; Shigeru Morishita, Wakayama; Tateki Mori, Wakayama, all of Japan

[73] Assignees: Sumitomo Heavy Industries, Ltd., Shinagawa; Sumitomo Metal Industries, Ltd., Osaka, both of Japan

[21] Appl. No.: 761,989

[22] Filed: Dec. 11, 1996

[30] Foreign Application Priority Data

Dec. 11, 1995 [JP] Japan .................................... 7-321933
Dec. 11, 1996 [JP] Japan .................................... 8-330505

[51] Int. Cl.[6] .................................................... C21B 11/06
[52] U.S. Cl. ................................ 75/414; 75/476; 75/961; 266/145; 266/173
[58] Field of Search ........................... 75/414, 476, 961; 266/145, 173

[56] References Cited

U.S. PATENT DOCUMENTS

| | | | |
|---|---|---|---|
| 2,045,639 | 6/1936 | Eulenstein et al. . | |
| 3,503,736 | 3/1970 | Sherwood | 75/476 |
| 4,525,208 | 6/1985 | Yasukawa et al. . | |
| 4,983,214 | 1/1991 | Bottinelli et al. | 266/173 |
| 5,616,296 | 4/1997 | Hittner et al. | 266/173 |

FOREIGN PATENT DOCUMENTS

| | | |
|---|---|---|
| 0275863 B1 | 7/1988 | European Pat. Off. . |
| 2021873 | 11/1971 | Germany . |
| 07-070662 A | 3/1995 | Japan . |

*Primary Examiner*—Melvyn Andrews
*Attorney, Agent, or Firm*—Burns, Doane, Swecker & Mathis, LLP

[57] ABSTRACT

In a method of recycling iron and steel industry waste by processing the waste as an object substance by the use of a rotary kiln, the object substance is changed into a valuable material while the object substance travels within the rotary kiln from an upstream side to a downstream side. The object substance is heated on the upstream side of the rotary kiln within a reducing atmosphere to be reduced and molten into a reduced and molten product. The reduced and molten product is quickly sent to the downstream side without being adhered to an internal wall of the rotary kiln. The valuable material is extracted from the reduced and molten product which may be directly discharged out of the rotary kiln or which may be discharged after the reduced and molten product is once kept in a basin formed in the vicinity of the downstream side of the rotary kiln.

20 Claims, 7 Drawing Sheets

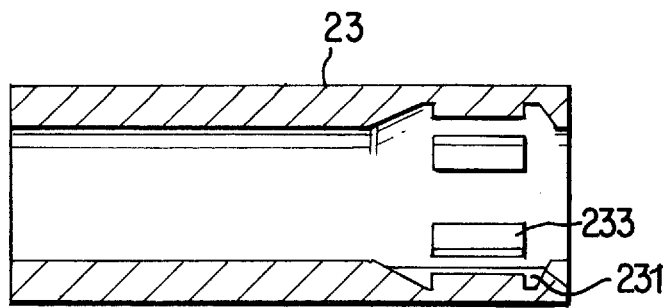
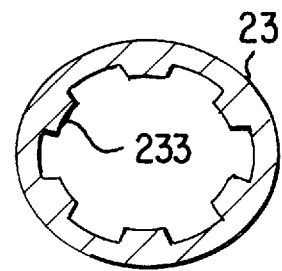
FIG. 4A  FIG. 4B
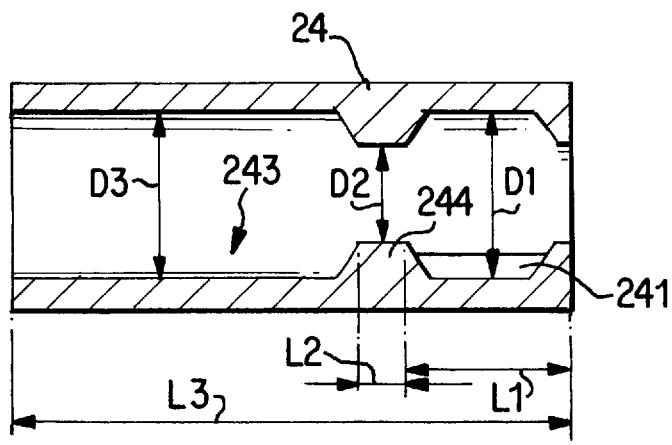
FIG. 5

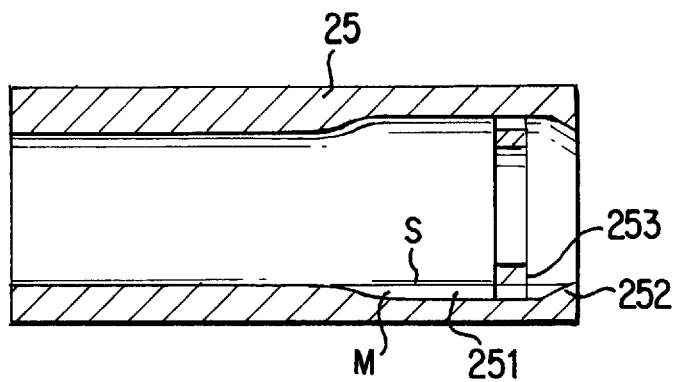
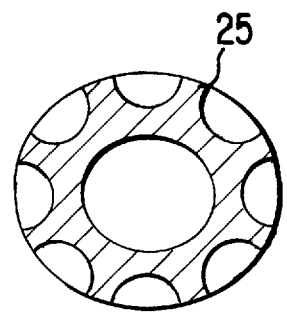
FIG. 6A  FIG. 6B
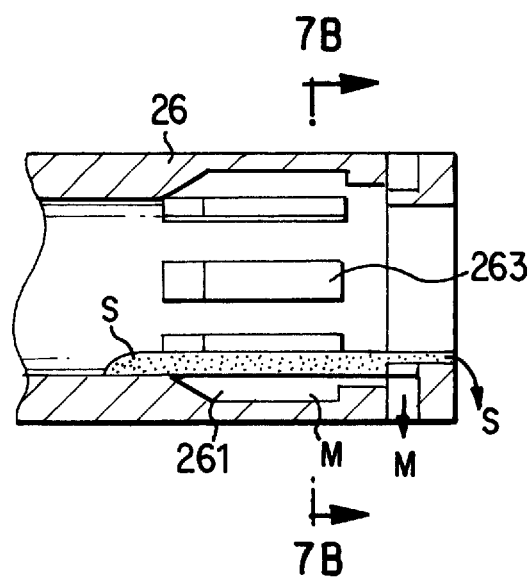
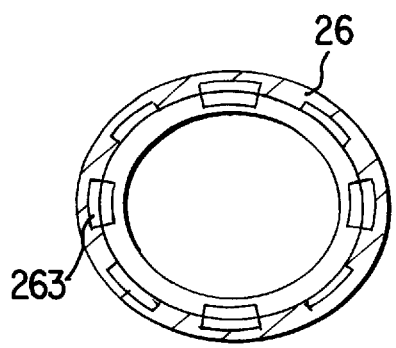
FIG. 7A  FIG. 7B

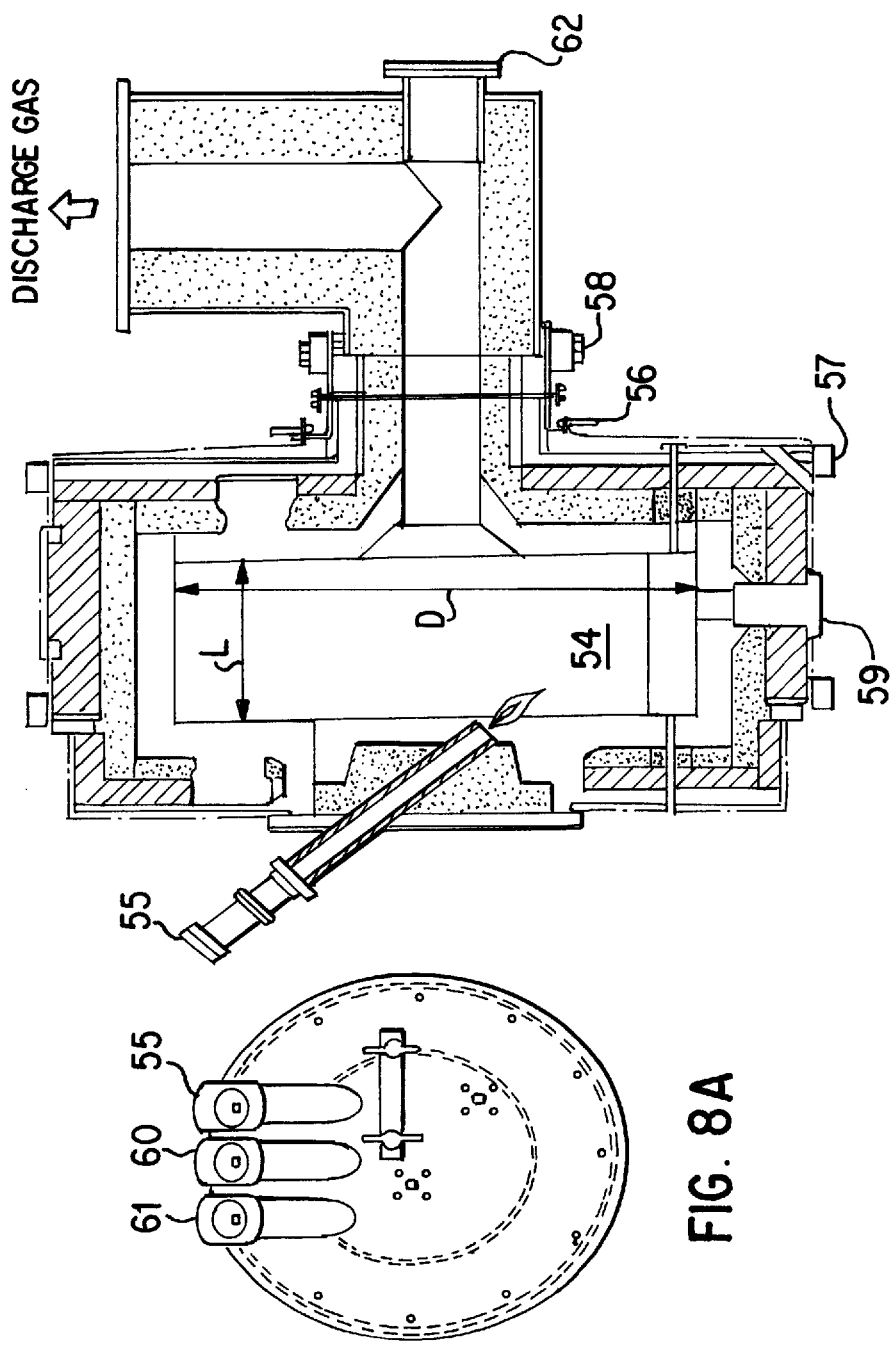

METHOD FOR RECYCLING IRON AND STEEL INDUSTRY WASTE

BACKGROUND OF THE INVENTION

This invention relates to a method and an apparatus for recycling iron and steel industry waste and, more specifically, to a method and an apparatus for processing an object substance or waste materials caused in iron and steel works to recover valuable materials from the object substance.

Generally, a large amount of various waste materials are inevitably caused to occur in iron and steel works. For example, the waste materials include iron ore dust and iron and steel dust. The iron and steel dust appears on an iron making process and a steel making process. Those waste materials will collectively be referred to as iron and steel industry waste or simply called waste.

Preferably, the iron and steel industry waste is reprocessed or recycled to recover valuable metals, such as iron, which remain in the iron and steel industry waste. Taking this into consideration, various conventional methods have been proposed to reprocess and recycle the waste of the type described, particularly, the iron ore dust and the iron and steel dust. However, those methods are very expensive and are therefore difficult to put into practical use in industry. Under the circumstances, the waste is very often disposed of in landfills, although a small part of the waste is recycled.

In recent years, an increase of the waste tends to become serious in relation to the capacity of the landfills.

Thus, the disposal of the waste becomes a nation-wide problem under a strict environmental regulation. Under the circumstances, it is an urgent demand to promote resource recovery.

In the meanwhile, consideration is made about reusing the waste in the iron making process or the steel making process because the waste includes iron, as mentioned before. However, it is to be noted that the steel and Iron industry waste generally contains heavy metals, such as zinc and lead. Such heavy metals must be removed and, otherwise, adversely affect a blast furnace, as well known in the art. In order to remove zinc or lead, various methods have been known and adopted in the art. Among others, two major methods are commonly used in the iron and the steel making processes and will hereafter be referred to as first and second methods.

Specifically, in the first method, zinc oxide contained in the waste is gradually reduced and evaporated by the use of cokes as a reductant in a rotary kiln. Thus, zinc oxide is removed from the waste. Furthermore, iron oxide is reduced to produce sponge iron which has a low zinc content and which is fed back into a blast furnace or a sintering machine.

In the second method, a zinc component contained in the waste is concentrated by the use of a wet cyclone to classify different substances by particle sizes. As a result, the waste is separated into a first part having a high zinc concentration and a second part having a low zinc concentration. The first part is used as a material in a nonferrous metal industry while the second part is fed back to the blast furnace or the sintering machine which is used in the iron making process. Thereafter, the second part is subjected to the steel making process.

As mentioned above, the blast furnace or the sintering machine is an apparatus used in the iron making process. In other words, recovered materials obtained by either of the first and the second method is usable in the iron making process preceding the steel making process.

Generally, the first method requires a preliminary treatment of processing the waste in the form of pellets of a predetermined size prior to feeding into the rotary kiln. In addition, the recovered materials from which zinc is removed can not be fed back in the steel making process but can be used as a material for the iron making process. This is because the valuable metals, such as iron, contained in the recovered materials has a low purity. Thus, the first method is disadvantageous in that the processing cost is high for the value of the recovered materials. On the other hand, the second method is disadvantageous in that the zinc component is neither sufficiently concentrated nor separated.

In either method, it is impossible to recover valuable materials at a low processing cost.

More specifically, the first method using the rotary kiln has another disadvantage which will presently be described.

The first method is literally a direct reduction of iron ore based on gas-solid reaction. Hence in this process accretion of several substances is inevitable inside of the rotary kiln, and consequently, it is difficult to operate the rotary kiln for a long time without stoppage due to the accretion problem. In consideration of this fact the rotary kiln for this purpose had to be operated below the melting point of iron.

Practically, the rotary kiln is operated at a relatively low furnace temperature which is not higher than about 1200° C.

Taking this into consideration, the rotary kiln is used which is long in length (L) in comparison with a diameter (D) and which has a ratio (L/D) not smaller than 20. In addition, a burner is placed on an exit side of the rotary kiln.

At any rate, the rotary kiln typically has a long cylindrical shape to assure a sufficiently long retention time. With the above-mentioned structure, the rotary kiln itself is bulky in size and expensive.

As described above, using the rotary kiln in recycling the iron and steel industry waste has been considered to be costly. Therefore, the rotary kiln has not been widely used to recycle the iron and steel industry waste, besides an exceptional example.

The use of the rotary kiln in recycling the iron and steel industry waste has another problem which will be described below.

With the above-mentioned arrangement, a combustion gas flows from the exit side in a direction opposite to the traveling direction of the waste within the rotary kiln. Such flow of the combustion gas is called a counter current. The counter current of the combustion gas serves to heat, together with the burner, the waste which travels towards the exit side of the rotary kiln. Inasmuch as the rotary kiln is very long as mentioned before, a temperature within the rotary kiln is gradually decreased from the exit side towards the entrance side. Although this structure is effective to gradually reduce the waste during traveling and to complete the reduction on the exit side, accretion of the waste to an inside wall of the rotary kiln takes place at a region where a temperature is largely varied. The accretion generally appears in the form of a ring and is therefore called a dam ring.

In addition to the iron ore dust and the iron and steel dust, the iron and steel industry waste includes sludge appearing on the acid pickling line and the galvanizing process. The sludge contains various substances, such as iron, nickel, and chromium. The sludge can not be processed by the use of the conventional rotary kiln because such sludge can not practically be dehydrated and pelletized.

The activities or processes in the iron and steel works and other facilities further produce combustible materials such as wastepaper, wood chips, and waste oil as well as various carbonaceous materials. The combustible materials and the carbonaceous materials will collectively be referred to as municipal waste. The combustible materials can be used as a part of fuel in processing the iron ore dust, the iron and steel dust, and the sludge to produce the sponge iron. On the other hand, the carbonaceous materials can be used as a reductant in producing the sponge iron. However, in case where the municipal waste other than the iron and steel industry waste (iron ore dust, the iron and steel dust, and the sludge) is processed as an object substance by the rotary kiln, it is difficult to stabilize the furnace temperature and to smoothly move the object substance within the rotary kiln.

As described above, the use of the rotary kiln in recycling the iron and steel industry waste has various problems which are desired to eliminate.

SUMMARY OF THE INVENTION

It is an object of this invention to provide a method and an apparatus for recovering, from an object substance, such as iron and steel industry waste, valuable materials, such as iron alloys, which can be directly used as a material in a steel making process.

According to this invention, there is provided a method of recycling iron and steel industry waste by processing the waste as an object substance by the use of a rotary kiln to recover a valuable material from the object substance while the object substance travels within the rotary kiln from an upstream side to a downstream side. The method comprises the steps of heating the object substance on the upstream side in the rotary kiln within a reducing atmosphere to obtain a reduced product and to melt the reduced product into a reduced and molten product comprising a metal melt and a slag, and recovering the valuable material from the reduced and molten product on the downstream side in the rotary kiln.

Preferably, in the above-mentioned method, the rotary kiln has a feeding end on the upstream side, a discharge end on the downstream side, a weir adjacent to the discharge end within the rotary kiln, and a basin formed in a predetermined range from the discharge end towards the upstream side. The basin is formed as a recessed portion having an inner diameter greater than that of the remaining portion.

According to this invention, there is also provided an apparatus for recycling iron and steel industry waste, the apparatus comprising a rotary kiln for processing the waste as an object substance to extract a valuable material from the object substance while the object substance travels within the rotary kiln from an upstream side to a downstream side, the rotary kiln having a heating burner located on the upstream side so that the object substance is heated to a predetermined temperature at which the object substance is molten, the rotary kiln having a gas-solid reaction section on the upstream side where metal oxides contained in the object substance are reduced to obtain a low-boiling-point metal which is evaporated and removed and to obtain a high-boiling-point metal as a reduced product which is molten into a reduced and molten product comprising a metal melt and a slag, the rotary kiln having an extracting section located on the downstream side for extracting the valuable material from the reduced and molten product.

Preferably, in the above-mentioned apparatus, the rotary kiln has a feeding end on the upstream side, a discharge end on the downstream side, a weir adjacent to the discharge end within the rotary kiln, and a basin formed in a predetermined range from the discharge end towards the upstream side. The basin is formed as a recessed portion having an inner diameter greater than that of the remaining portion.

In the above-mentioned manner, the iron ore dust and the iron and steel dust caused in the iron and the steel making processes are reproduced into reusable resources. Specifically, the iron and steel dust is reduced, molten, and separated into two layers of metal melt and slag which are separately collected or recovered. The metal melt is cooled to obtain the iron alloy which can directly be used as a steel making material. Alternatively, the iron alloy may be used in the iron making process. Even the slag can be used as a cement material or a roadbed material.

In addition to the iron and steel dust, the sludge appearing on the acid pickling line and the galvanizing process can be recovered as reusable resources by mixing the sludge with the iron and steel dust to be simultaneously processed. Among municipal waste, combustible materials such as wastepaper, wood chips, and waste oil can be used as a part of fuel while carbonaceous materials can be used as coal required in reduction.

BRIEF DESCRIPTION OF THE DRAWING

FIGS. 4A and 4B are a longitudinal sectional view and a transversal sectional view of a third example of the rotary kiln with a basin, respectively;

FIG. 5 is a longitudinal sectional view of a fourth example of the rotary kiln;

FIGS. 6A and 6B are a longitudinal sectional view and a transversal sectional view of a fifth example of the rotary kiln with a basin, respectively;

FIGS. 7A and 7B are a longitudinal sectional view and a transversal sectional view of a main portion of a sixth example of the rotary kiln with a basin. respectively;

FIGS. 8A and 8B are an end view and a sectional view of a test furnace used to evaluate the method of this invention, respectively;

DESCRIPTION OF THE PREFERRED EMBODIMENTS

Figure 1:
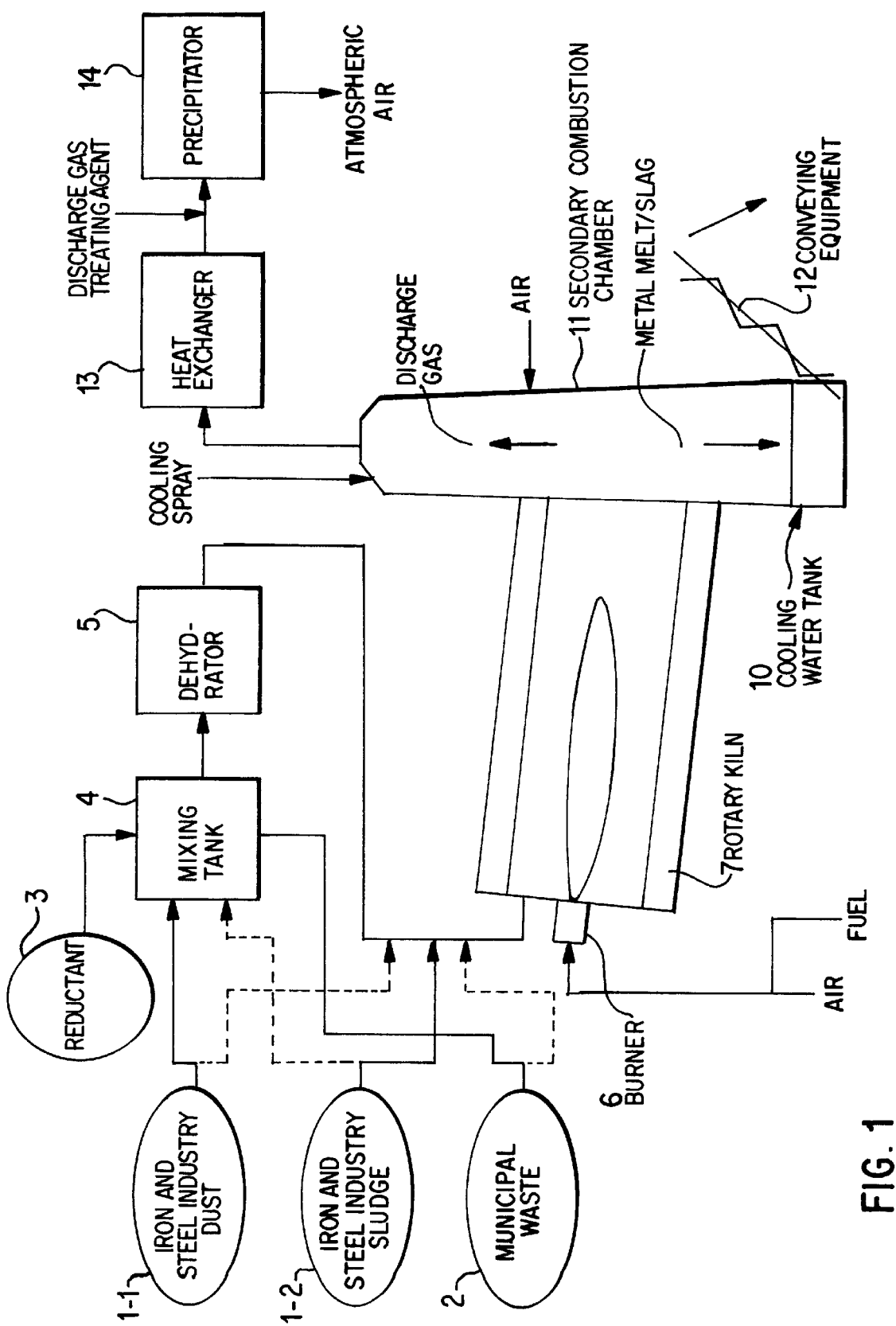
FIG. 1 is a view for describing a method of recycling iron and steel industry waste according to this invention.

Now, description will at first be made as regards a principle of this invention.

In the method according to this invention, the object substance is quickly heated to a high temperature to obtain, through a gas-solid reaction, a molten product as a reduced product containing sponge iron. At the high temperature, the molten product is separated into a metal melt and a slag to be separately recovered. The slag may be molten or may not be molten. The metal melt is thereafter cooled to become an iron alloy. Accordingly, it is possible to eliminate the disadvantage in the conventional methods due to the accretion and to efficiently recover valuable materials.

The rotary kiln used in the method of this invention has a length L and an inner diameter D in a ratio (L/D) considerably smaller than that in the conventional methods. Preferably, the ratio is not greater than 5. As described above, the rotary kiln has the heating burner located on an upstream side thereof. With this structure, the interior of the rotary kiln can be substantially entirely heated to a high temperature. Even in occurrence of the accretion described above, the accretion is heated by the heating burner to be molten and removed. Thus, the method of this invention adopts a unique approach different from the conventional methods.

In the method of this invention, the rotary kiln is operated to reduce the object substance into a reduced product by the use of a carbonaceous reductant and to melt the reduced product for recovery of reusable materials. The object substance includes iron ore dust, iron and steel dust appearing on an iron making process and a steel making process, and sludge appearing on an acid pickling line and a galvanizing process and containing various substances such as iron, nickel, and chromium. Specifically, metal oxides contained in the object substance are reduced by the use of the reductant into metals. Among those metals, low-boiling-point metals such as zinc are evaporated and removed. On the other hand, high-boiling-point metals such as iron are recovered as the metal melt which is then cooled to obtain the iron alloy. A residue is separated and recovered as slag.

Accordingly, the iron alloy thus recovered have a low zinc content ($Zn/Fe \leq 1.0/1000$ in a weight ratio) and can be reused in the steel making process. Alternatively, it may be reused in the iron making process.

Prior to feeding the object substance into the rotary kiln, the carbonaceous reductant (pulverized coal, coke breeze, or the like) is mixed with the object substance in a known dry or wet process. If prepared through the dry process, the mixture is fed into the rotary kiln directly or after mixed with a dehydrated cake obtained in the wet process. On the other hand, the mixture prepared through the wet process is dehydrated to form a dehydrated cake which is then fed into the rotary kiln directly or after mixed with pulverized coal.

The rotary kiln in this invention has a basic structure characterized in that:

(1) The heating burner is located on the upstream side of the rotary kiln. This means that the flow of a combustion gas is parallel to the flow of the object substance.

(2) The length L and the diameter D of the rotary kiln are selected so that the ratio L/D is not greater than 5 ($L/D \leq 5$).

(3) The rotary kiln has an inclination between 1° and 2° with respect to the horizontal plane to assure a sufficient retention time required in reaction (reduction) or melting.

(4) The rotary kiln has a gas discharge end coupled to a secondary combustion chamber.

In order to improve the recovery ratio of an iron alloy as a recovered material, slag materials such as incineration ash may be mixed into the object substance to be molten together. In this event, the surface of a metal melt layer is sufficiently covered with a slag layer to avoid oxidation of the metal melt layer.

The secondary combustion chamber coupled to the discharge end of the rotary kiln is supplied with a discharge gas from the rotary kiln to completely burn unburnt materials contained in the discharge gas. In addition, the secondary combustion chamber carries out high-temperature pyrolysis to convert hazardous substances such as dioxine into a nonhazardous gas which is released out of the system. Heat energy of the discharge gas heated to a high temperature and combustion heat in the secondary combustion chamber are recovered in a boiler at a succeeding stage by the use of vapor. Thus, heat loss in a whole process is suppressed.

The metal melt and the slag are fed into a water tank located below the discharge end of the rotary kiln. After cooled in the water tank, the metal melt and the slag are discharged out of the system as the recovered material. The cooling water tank 10 is continuously supplied with circulated water by which the metal melt and the slag are agitated and fully cooled. If necessary, the metal melt and the slag can be separated by utilizing magnetic separation at a later stage.

Hereinafter, a method and an apparatus for recycling iron and steel industry waste according to this invention will be described in detail with reference to the drawings.

Referring to FIG. 1, the method of this invention will be described. Iron and steel industry waste caused in iron and steel works includes iron and steel industry dust 1-1 and iron and steel industry sludge 1-2 and is treated as a main object substance. The iron and steel industry dust 1-1 includes iron ore dust, iron and steel dust collected in an iron making process or a steel making process, and incineration ash. The iron and steel industry sludge 1-2 is caused in an acid pickling line and a galvanizing process.

As a preliminary treatment, the iron and steel industry dust 1-1 is mixed with a carbonaceous reductant 3, such as pulverized coal and coke breeze, in a wet mixing tank 4 to form a mixture. The mixture is dehydrated by a dehydrator 5 to form a dehydrated cake which is fed into a rotary kiln 7. Among the iron and steel industry dust 1-1, a slag material such as the incineration ash can be directly fed into the rotary kiln 7.

In most cases, the iron and steel industry sludge 1-2 is directly fed into the rotary kiln 7 without being mixed in the wet mixing tank 4 because the dehydration is difficult as described above. If the iron and steel industry sludge 1-2 requires reduction by carbon, an external reductant (not shown) is separately fed into the rotary kiln 7 when the sludge is directly fed into the rotary kiln 7.

In addition, municipal waste 2 such as wastepaper, wood chips, plastic waste, pulp waste, pulp sludge, and waste oil, may be used as a substitute or a supplemental substance to the carbonaceous reductant 3. Specifically, the municipal waste 2 is mixed with the object substance by the use of the wet mixing tank 4, like the carbonaceous reductant 3. It will be understood that, even if it is used as the reductant, the municipal waste 2 itself is substantially processed as the object substance. In the municipal waste 2, those having small specific gravities or containing oil components are unsuitable to wet mixing and are directly fed into the rotary kiln 7.

The dehydrated cake as an object substance to be processed is fed into the rotary kiln 7 with an ambient temperature of a feeding section kept between 500° and 700° C. At this time, the exterior reductant is added if necessary, as described above. The rotary kiln 7 is of a parallel current type and has a heating burner 6 located at the feeding section.

Subsequently, the object substance is heated, reduced, and molten within the rotary kiln 7.

Specifically, the object substance introduced into the rotary kiln 7 travels within the rotary kiln 7 from the feeding section towards a discharge section and heated by the burner 6 located at the feeding section. Through the following steps S1 through S4, the object substance is reduced, molten, and separated into a metal melt and a slag which are discharged from the rotary kiln 7 and further cooled.

Step S1—Drying Process

The object substance introduced into the rotary kiln 7 is heated to evaporate the moisture contained in the object substance. As a result, the object substance is dried and travels within the rotary kiln 7. In this event, the object substance may be agglomerated In the rotary kiln 7.

Step S2—Reduction Process

After completion of the drying process, reduction of metal oxides, such as iron oxide, chromium oxide, nickel oxide, zinc oxide, and lead oxide, contained in the object substance is actively performed within the rotary kiln 7. A mass of the object substance introduced into the rotary kiln 7 may be called a bed. When the bed is heated to a temperature within a range approximately between 1000° C. and 1200° C., the reduction is substantially completed. Low-boiling-point metals such as zinc obtained by the reduction are evaporated and transferred from the bed in a reducing atmosphere to a gas space in an oxidizing atmosphere. In the oxidizing atmosphere, the low-boiling-point metals are oxidized and released out of the rotary kiln 7 together with a discharge gas to be captured by a precipitator 14 at a later stage.

On the other hand, high-boiling-point metals such as sponge iron obtained by the reduction are held in the bed. As a result of the reduction of the metal oxides, carbon monoxide is produced and burnt immediately above the bed in presence of excessive air from the burner 6. The burning of carbon monoxide contributes to heating of the bed in combination with a hot gas from the burner 6. The burning flame of carbon monoxide also contributes to maintain the bed in the reducing atmosphere.

Step S3—Melting Process

When the reduction through gas-solid reaction comes to an end and the temperature further rises to 1200° C. or more, the sponge iron is saturated with carbon in the reductant to be transformed into the metal melt. The metal melt further incorporates those metals such as chromium and nickel to comprise iron alloy components. The remainder except the iron alloy components contains oxides, such as $SiO_2$, CaO, and $Al_2O_3$, and may be called a slag. The metal melt and the slag are transferred to the discharge section of the rotary kiln 7. At the discharge section kept at a temperature between 1250° and 1300° C., the metal melt and the slag are separated by utilizing a gravity difference between the melts. Specifically, the specific gravity of the metal melt is greater than that of the slag. As a result, the metal melt is sedimented under the slag and is completely covered with the slag. The slag thus serves to isolate the metal melt from the oxidizing atmosphere. The metal melt and the slag separated by the specific gravity are discharged from a discharge end of the rotary kiln 7 to a cooling water tank 10.

If the object substance contains hexavalent chromium which is a hazardous substance, the hexavalent chromium is processed through the reducing and the melting steps mentioned above to be transformed into metal chromium or trivalent chromium which is a nonhazardous substance.

Step 4—Discharging and Cooling Process

The metal melt and the slag are discharged from the rotary kiln 7 and supplied to the cooling water tank 10 located below the discharge end of the rotary kiln 7. After cooled in the cooling water tank 10, the metal melt and the slag are discharged by conveying equipment 12 out of the cooling water tank 10 as a recovered material. The cooling water tank 10 is continuously supplied with circulated water by which the metal melt and the slag are agitated and fully cooled. If necessary, the metal melt and the slag can be separated by utilizing magnetic separation at a later stage.

Subsequently, the discharge gas is discharged or released out of the rotary kiln 7 to be processed later. The discharge gas from the rotary kiln 7 is introduced into the secondary combustion chamber 11 coupled to the discharge end of the rotary kiln 7. The secondary combustion chamber 11 attains complete combustion of unburnt materials contained in the discharge gas. In addition, hazardous substances contained in the discharge gas are decomposed by heat and changed into nonhazardous substances. The discharge gas thus processed is then delivered through a heat recovery unit or heat exchanger 13, such as a boiler, to the precipitator 14 to be released into the atmospheric air.

Taking the nature of the object substance, the desired amount and quality of the recovered material into consideration together with the cost of the reductant and the fuel, the atmosphere within the rotary kiln 7 may be selected from two options, namely, (A) a reducing or a very weak oxidizing atmosphere and (B) a weak oxidizing atmosphere.

(A) Reducing or Very Weak Oxidizing Atmosphere

An inside space of the rotary kiln 7 is assumed to be kept in the reducing atmosphere or the very weak oxidizing atmosphere with a low oxygen content. In such an atmosphere, the metal melt is hardly oxidized. In order to provide such an atmosphere, it is required to sufficiently fill the reductant within the rotary kiln 7. Specifically, the amount of the reductant added to the object substance may be greater than twice the stoichiometric equivalent required for the reduction. Alternatively, the concentration of carbon monoxide which is caused to occur in the gas space as a result of the reduction is kept at 5% or more at the discharge end, namely, on the exit end of the rotary kiln 7. In the above-mentioned condition, the rotary kiln is preferably provided with a basin which is formed in the discharge section to reserve the metal melt and the slag. In the basin, the metal melt and the slag are brought into sufficient contact with each other. During such contact, those elements incorporated in the slag are distributed between the slag and the metal melt by the transfer of metal elements from the slag into the metal melt and the distribution reaction between the metal melt and the slag. Therefore, the metal melt and the slag stable in composition are discharged from the rotary kiln as the recovered material. The metal melt is processed into an iron alloy. As a result, it is possible to improve the recovery ratio of the iron alloy while a decreased amount of the metal content is left in the slag. Thus, the slag which includes a small amount of the metal content can be widely used in various fields.

According to this invention, the rotary kiln with a basin may be formed in various structures. Among others, some typical structures will hereinafter be described with reference to the drawing.

Figure 2:
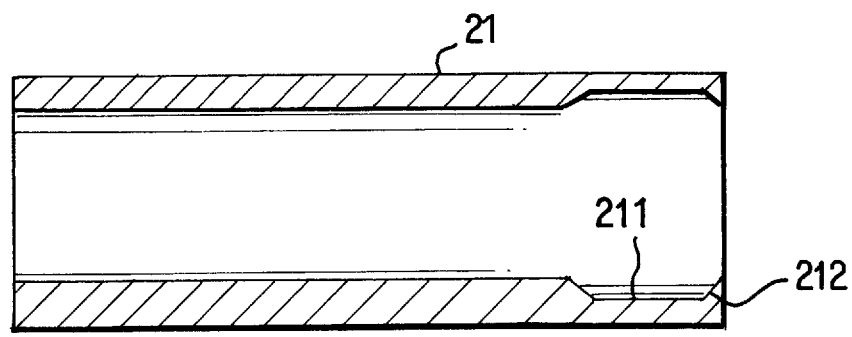
FIG. 2 is a longitudinal sectional view of a first example of a rotary kiln with a basin for use in practicing the method according to this invention.

Referring to FIG. 2, a rotary kiln 21 of a simplest shape has a length which may, for example, fall within a range between 10 and 15 m from an entrance end (lefthand side in the figure) to a discharge end (righthand side in the figure). The rotary kiln 21 has a basin 211 and a discharge weir 212 on an inside surface thereof. The basin 211 is formed over a predetermined range from the discharge end of the rotary kiln 21 and is extended towards the entrance end. For example, the predetermined range is between 1 m and 2 m in case of the rotary kiln of the above-mentioned length.

Specifically, the basin 211 is formed by widening the inner diameter of the rotary kiln 21 over the above-mentioned predetermined range. A molten product, including the metal melt and the slag, is held in the basin 211 for a predetermined time duration to accelerate the separation of the metal melt from the slag. To widen the inner diameter of the rotary kiln 21, an internal refractory layer (not shown) formed on the internal surface of the rotary kiln 21 is reduced in thickness over the above-mentioned predetermined range corresponding to the basin 211 without changing the outer diameter of a shell of the rotary kiln 21. Alternatively, the outer diameter of the shell is widened without changing the thickness of the internal refractory layer.

Figure 3A:
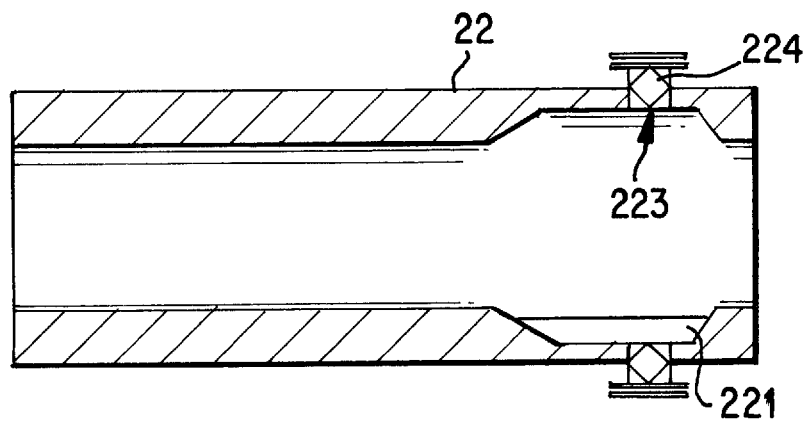
FIGS. 3A and 3B are a longitudinal sectional view and a transversal sectional view of a second example of the rotary kiln with a basin, respectively.
Figure 3B:
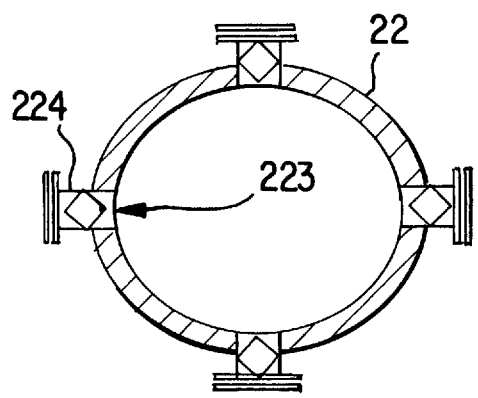

Referring to FIGS. 3A and 3B, a rotary kiln 22 has a basin 221, at least one pair of discharge paths 223 formed in the rotary kiln 22 at positions opposite to each other in a radial direction, and at least one pair of discharge plugs 224 fitted into the discharge paths 223. The discharge paths 223 serve to discharge the above-mentioned molten product out of the rotary kiln 22 when the operation of the rotary kiln 22 is stopped. The discharge plugs 224 are removed from and fitted into the discharge paths 223 to open and close the discharge paths 223, respectively.

Referring to FIGS. 4A and 4B, a rotary kiln 23 has a basin 231 and lifters 233 formed in the basin 231.

The lifters 233 serve to stir up the slag in the basin 231 for better contact between the slag and the metal melt so as to enhance the transfer of the metal elements incorporated in the slag into the metal melt and the distribution reaction between the metal melt and the slag.

Referring to FIG. 5, a rotary kiln 24 comprises a cylindrical shell and an internal refractory layer formed on an internal surface of the shell although the shell and the internal refractory layer are not separately shown In the figure. The internal refractory layer defines a basin 241 having an inner diameter D1 and a length L1, an intermediate section 244 having an inner diameter D2 (D2<D1) and a length L2, and a gas-solid reaction section 243 having a length L3 and an inner diameter D3 equal to the inner diameter D1 of the basin 241. The gas-solid reaction section 243 is separated by the intermediate section 244 from the basin 241. The basin 241, the intermediate section 244, and the gas-solid reaction section 243 can be formed into desired shapes by varying the thickness of the internal refractory layer without changing the diameter of the shell. In addition, the bed in the gas-solid reaction section 243 can be thickened with this structure so that an influence of the oxidizing atmosphere to the bed is suppressed. Thus, the bed can be kept exposed in the reducing atmosphere. Furthermore, in presence of the intermediate section 244, the molten product held in the basin 241 is prevented from spreading back to the gas-solid reaction section 243 and never interferes the travel of with the object substance from the upstream side to the downstream side. In addition, it is easy to change the areas of the gas-solid reaction section 243 and the basin 241 by replacing the internal refractory layer without changing the outer diameter of the shell.

Referring to FIGS. 6A and 6B, a rotary kiln 25 has a basin 251, a discharge weir 252, and an internal weir 253. With this structure, the surface of a metal melt layer M in the basin 251 is covered with a slag layer S having a certain thickness. This serves to prevent the surface of the metal melt layer M from being exposed to the oxidizing atmosphere.

Referring to FIGS. 7A and 7B, a rotary kiln 26 has a basin 261 and a plurality of grooves 263 formed in the basin 261 to extend in a longitudinal direction of the rotary kiln 26. The metal melt layer M is deposited in the grooves 263 and discharged through the grooves 263. On the other hand, the slag layer S is discharged over the entire circumference of the rotary kiln 26. This structure is advantageous in that the slag layer S and the metal melt layer M can be separately discharged through different positions and that the metal melt layer in the basin 261 is prevented from being discharged all at once even if a large amount of the molten product is produced.

(B) Weak Oxidizing Atmosphere

The inside space of the rotary kiln may be kept in the oxidizing atmosphere such that oxidation is caused to occur when the metal melt is held within the rotary kiln for a long time. In order to create such an atmosphere, the amount of the reductant added to the object substance is not greater than approximate twice the stoichiometric equivalent required for the reduction. The concentration of carbon monoxide produced in the gas space as a result of the reduction is lower than approximate 5% at the discharge end. In this event, no basin should be formed in the rotary kiln. In other words, no such weir that forms the basin is provided at the discharge section of the rotary kiln. This means that the rotary kiln is designed so that the metal melt is discharged as immediately as possible without being held within the rotary kiln. The metal melt is processed into the iron alloy. As compared with the structure having the basin, the recovery ratio of the iron alloy is relatively low and the metal content in the slag is relatively high. Nevertheless, such no-basin structure is advantageous in that the amount of the reductant added to the object substance can be decreased, specifically, to the order as small as 1.2 to 1.5 times the stoichiometric equivalent required for the reduction. In addition, the fuel is saved because carbon monoxide produced as a result of the reduction is burnt within the rotary kiln.

EXAMPLE

Description will be made about a specific example of the method of recycling the iron and steel industry waste and the apparatus for practicing the method.

In this example, typical dust caused in the iron and steel works was subjected to a test. The dust used in the test was caused to occur in a stainless steel making process.

The composition of the dust as an object substance or material is shown in Table 1.

TABLE 1

| | | | | wt % | | | | | |
|---|---|---|---|---|---|---|---|---|---|
| T.Fe | FeO | $Fe_2O_3$ | Cr | Ni | Zn | Pb | C | P | S |
| 39.6 | 9.8 | 45.8 | 8.1 | 2.5 | 0.50 | 0.10 | 0.83 | 0.06 | 0.14 |
| | CaO | | $SiO_2$ | | $Al_2O_3$ | | MgO | | MnO |
| | 8.6 | | 4.3 | | 0.40 | | 9.3 | | 2.5 |

As a preliminary treatment of the material, the above-mentioned dust in a powdery phase was mixed with a reductant of coke breeze in a wet process. After dehydration, the mixture was fed to a test apparatus. The mixing ratio of the dust/coke was 100/43 at a weight ratio. Such ratio of the coke breeze corresponds to twice the stoichiometric equivalent required for the reduction.

The test apparatus used in this test was a test furnace of a batch-process rotary-kiln-type furnace as illustrated in FIG. 8. It is noted here that, although the test furnace is not completely the same in structure as the rotary kiln of a commercial equipment, a traveling position of the object substance in a longitudinal direction within the rotary kiln corresponds to a processing time in the test furnace. Referring to FIG. 8, the rotary furnace has a furnace chamber 54, a burner 55, a driving sprocket 56, a roller 57, a slip ring 58, a discharge plug 59, a first inspection port 60, a furnace monitor camera 61, and a second inspection port 62. The furnace chamber has an inner diameter D of 1300 mm and a length L of 500 mm.

In the test, a dehydrated cake of 140 kg having a moisture content of 22% was fed into the rotary furnace preliminarily held at 500° C. and heated with a propane gas used as a fuel.

Figure 9:
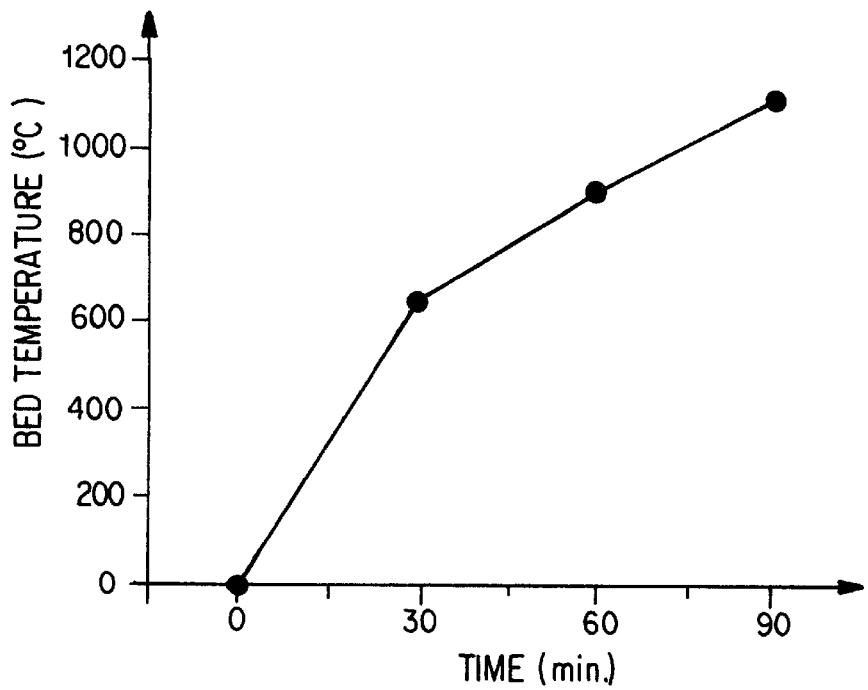
FIG. 9 is a graph showing a bed temperature rising rate observed by the use of the test furnace illustrated in FIGS. 8A and 8B.

The revolution of the rotary furnace was 0.4 rpm. The temperature rising rate of the bed is shown in FIG. 9. At every 30 minutes after supply of the dust (dehydrated cake), sampling of the metal melt and the slag was carried out until the molten product was produced. From the analysis of samples, a degree of zinc removal, a degree of reduction, and a degree of metallization were obtained. Specifically, the degree of zinc removal is given by (Initial Zinc Content—Current Zinc Content)/(Initial Zinc Content). The degree of reduction is given by (Initial Oxygen Content—Current Oxygen Content)/(Initial Oxygen Content). The degree of metallization is given by (Current Metal Fe)/(Current Total Fe).

Furthermore, after production of the molten product, sampling of the metal melt and the slag was continued. From the analysis of compositions of the metal melt and the slag, the distribution of each metal element between the metal melt and the slag was obtained. The test was carried out five times under the same condition to obtain five test results.

In those five test results, little fluctuation was observed. Accordingly, one of the test results alone is shown in FIG. 10.

Figure 10:
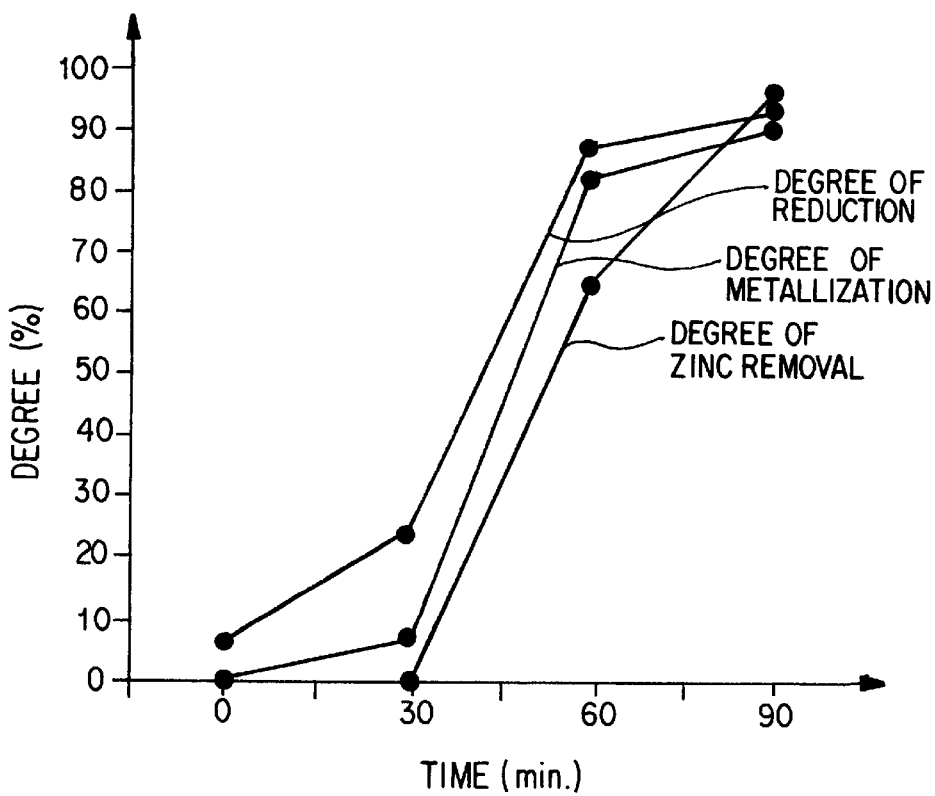
FIG. 10 is a graph showing a degree of reduction, a degree of metallization, and a degree of zinc removal observed at several time points before melt formation in the test furnace illustrated in FIGS. 8A and 8B.

FIG. 10 shows the degree of reduction, the degree of metallization, and the degree of zinc removal at different time points before melt formation.

Referring to FIG. 10, it is understood that each of those values reaches 90% or more after lapse of about 90 minutes from feeding of the dust into the rotary kiln.

After lapse of about 100 minutes from feeding of the dust, the metal melt was produced. At that time, the temperature of the bed was between about 1250° and 1300° C. and the slag was molten also. Table 2 shows the result of analysis of the iron alloy and the slag which were sampled after lapse of 120 minutes.

In Table 2, T.Fe and Me.Fe represent "total Fe" and "metallic Fe", respectively.

The iron alloy had a composition approximate to that of a high-carbon austenite-based stainless steel containing Ni and Cr and was nonmagnetic. The contents of P and S were between 0.09 and 0.15% and between 0.05 and 0.14%, respectively.

TABLE 2

| | Iron Alloy (wt %) | | | | | | | |
|---|---|---|---|---|---|---|---|---|
| Test No. | T.Fe | Zn | Pb | Cr | Ni | S | P | C |
| 1 | 82.4 | 0.016 | 0.02 | 6.7 | 4.2 | 0.14 | 0.15 | 3.3 |
| 2 | 72.0 | 0.015 | 0.02 | 8.0 | 3.9 | 0.09 | 0.14 | 4.2 |
| 3 | 69.7 | 0.033 | 0.03 | 11.0 | 4.0 | 0.05 | 0.12 | 5.4 |
| 4 | 71.0 | 0.005 | 0.01 | 14.2 | 3.7 | 0.09 | 0.09 | 4.7 |
| 5 | 63.4 | 0.006 | 0.01 | 16.9 | 4.0 | 0.06 | 0.09 | 5.2 |

| | Slag (wt %) | | | | | | | | |
|---|---|---|---|---|---|---|---|---|---|
| Test No. | T.Fe | Me.Fe | Zn | Pb | Cr | Ni | CaO | SiO$_2$ | Al$_2$O$_3$ | MgO |
| 1 | 22.1 | 19.2 | 0.006 | 0.014 | 9.0 | 0.7 | 21.2 | 15.1 | 6.7 | 13.4 |
| 2 | 13.1 | 11.1 | 0.006 | 0.011 | 8.5 | 0.6 | 24.3 | 17.2 | 6.3 | 17.3 |
| 3 | 18.6 | 14.6 | 0.024 | 0.013 | 6.6 | 0.7 | 18.8 | 13.8 | 4.4 | 13.0 |
| 4 | 17.7 | 11.0 | 0.014 | 0.008 | 10.2 | 0.6 | 20.6 | 14.2 | 10.3 | 14.9 |
| 5 | 22.0 | 18.3 | 0.006 | 0.007 | 9.6 | 1.1 | 23.4 | 14.5 | 4.2 | 16.7 |

Figure 11:
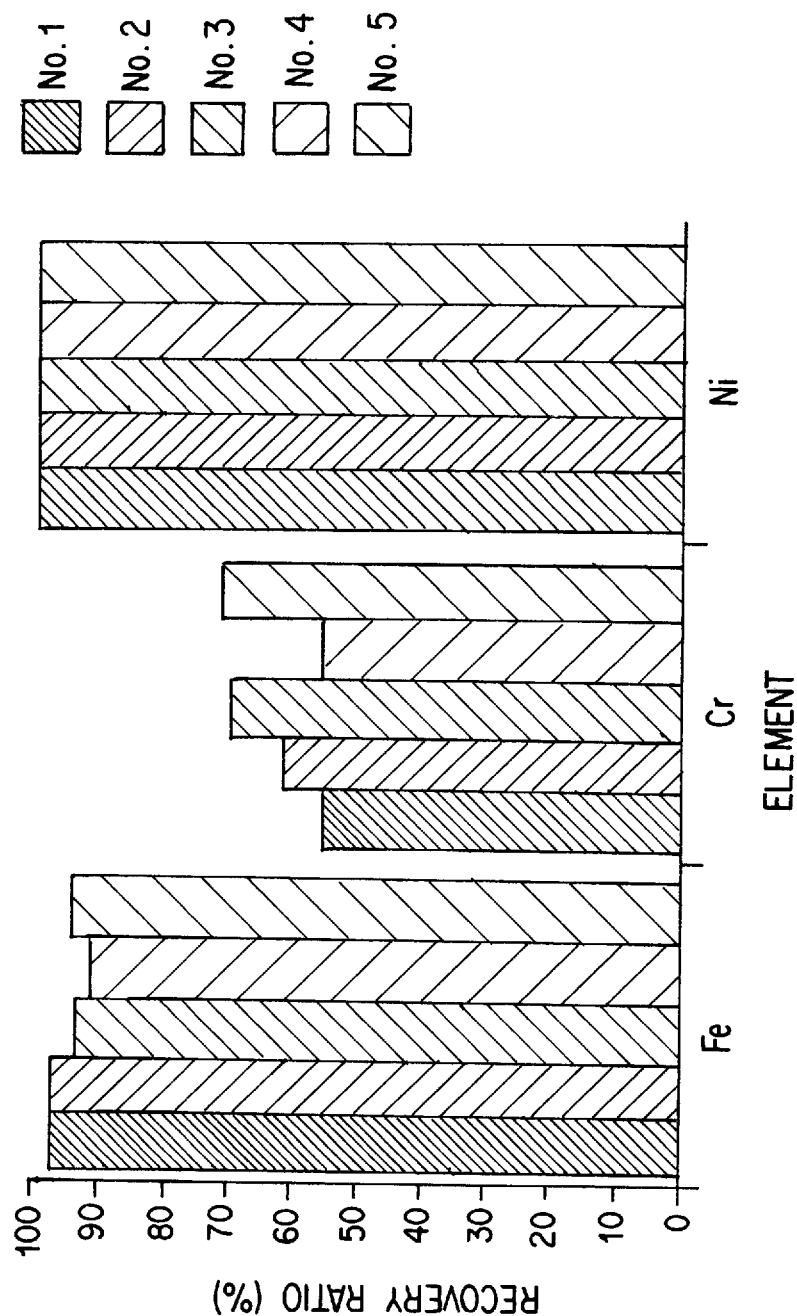
FIG. 11 is a graph showing a distribution ratio of each metal element initially contained in an object substance into an iron alloy product obtained by the test furnace illustrated in FIGS. 8A and 8B.

From the values obtained through the analysis, recovery ratios of Fe, Ni, and Cr contained in the iron alloy were obtained as shown in FIG. 11. The recovery ratio of 100 represents the initial content of each of Fe, Ni, and Cr contained in the object substance. The recovery ratios correspond to the distribution ratios of Fe, Ni, and Cr into the iron alloy.

As will be understood from FIG. 11, the recovery ratios of Fe, Ni, and Cr in the iron alloy were between 92 and 98%, about 100%, and between 56 and 72%, respectively.

In the method and the apparatus according to this invention, it is possible to recycle the iron and steel industry waste by the use of the rotary kiln for processing the object substance or the waste such as the iron ore dust, the iron and steel dust, and the sludge caused in the various processes in the iron and steel works. In the reduction process, the metal oxides contained in the object substance are reduced by the use of the reductant in the gas-solid reaction section at the upstream side of the rotary kiln to obtain the low-boiling-point metals and the high-boiling-point metals. The low-boiling-point metals are evaporated and removed.

On the other hand, the high-boiling-point metals are held as the reduced product and molten into the metal melt. The high-boiling-point metals are separated from the other slag component at the downstream side in the rotary kiln. Accordingly, it is possible to recover a valuable material which can be directly used as a material in a steel making process. In contrast, in the conventional method, the iron ore dust and the iron and steel dust caused in the iron making and the steel making processes are subjected to zinc removal for feedback to the blast furnace or the sintering machine. As compared with such conventional methods, this method is industrially useful. In addition, according to this invention, it is possible to utilize not only the iron alloy but also the slag which has a less metal content and is hardly oxidized.

In the conventional methods, it is very hard to recycle the sludge caused in the acid pickling line and the galvanizing process because of a difficulty of dehydration.

On the other hand, according to this invention, the various waste materials including the sludge can be processed and recovered as useful materials. In addition, it is also possible to simultaneously process a wide variety of waste materials which have been difficult to recycle and which have been incinerated and disposed of in the landfills. For example, the waste may be, for example, pulp waste, household dust, or the like.

What is claimed is:

1. A method of processing waste which includes metal as an object substance by the use of a short rotary kiln to recover a recovered material from said object substance while said object substance travels in a downward direction within said rotary kiln from an upstream side to a downstream side thereof, the short rotary kiln having an inner diameter D, a length L, a ratio L/D not greater than 5, and a single burner on the upstream side, said method comprising the steps of:

feeding the object substance into the upstream side of the rotary kiln;

forming a reducing atmosphere in the rotary kiln;

injecting a combustion gas from the burner into the rotary kiln such that the combustion gas flows in the downward direction;

heating and melting said object substance with the single burner in the reducing atmosphere on the upstream side in said rotary kiln while the object substance travels in the downward direction within the rotary;

forming a reduced and molten product on the downstream side of the rotary kiln, the reduced and molten product comprising a metal melt and a slag; and recovering said recovered material from the reduced and molten product outside of said rotary kiln.

2. A method as claimed in claim 1, said method further comprising the step of:

supplying the combustion gas so as to flow in said downward direction and heat said object substance to a temperature at which said object substance is molten on the upstream side of the rotary kiln.

3. A method as claimed in claim 2, wherein the heating step comprises the steps of:

preparing said object substance which includes a low-boiling-point metal which evaporates at a first temperature and a high-boiling-point metal which evaporates at a second temperature higher than the first temperature; and thermally processing said object substance at a temperature between the first and second temperatures to evaporate and remove the low-boiling-point metal from said reduced product and to leave only said high-boiling-point metal within said reducing atmosphere.

4. A method as claimed in claim 1, wherein said recovering step comprises the step of:

allowing the reduced and molten product to pass through said rotary kiln as said recovered material.

5. A method as claimed in claim 1, the reduced and molten product including said metal melt having a first specific gravity and said slag having a second specific gravity smaller than the first specific gravity, wherein said recovering step comprises the steps of:

guiding the reduced and molten product towards the downstream side; and gravity separating the reduced and molten product into said metal melt and said slag.

6. A method as claimed in claim 1, wherein the object substance includes iron oxide and zinc oxide, the zinc oxide being evaporated into the reducing atmosphere and subsequently oxidized in an oxidizing atmosphere in the rotary kiln, the iron oxide being reduced to molten iron and separated from the oxidizing atmosphere by said slag.

7. A method as claimed in claim 1, wherein said rotary kiln has a feeding end on the upstream side, a discharge end on the downstream side, a weir adjacent to said discharge end within said rotary kiln, and a basin in a zone extending from said discharge end towards the upstream side, said basin being formed as a recessed portion having an inner diameter greater than that of the remaining portion, the reduced and molten product being formed in the basin.

8. A method as claimed in claim 7, wherein said basin holds the reduced and molten product for a time sufficient to accelerate reduction of metal components and separation of said metal components from slag components.

9. A method as claimed in claim 8, wherein said basin of the rotary kiln has a lifter stirring up the reduced and molten product.

10. A method as claimed in claim 8, wherein said basin has a plurality of grooves extending in a longitudinal direction of said rotary kiln and spaced from one another in a circumferential direction of said rotary kiln, the reduced and molten product being discharged from the rotary kiln through the grooves.

11. A method as claimed in claim 8, wherein said rotary kiln further has an internal weir upstream of said weir in said basin, the weirs forming a layer of the slag of sufficient thickness on the metal melt so that the metal melt is prevented from being exposed to an oxidizing gas atmosphere.

12. A method as claimed in claim 8, wherein said basin of said rotary kiln has discharge paths formed at two positions opposite to each other in a radial direction of said rotary kiln and the paths are opened and closed by plugs, the method including discharging the reduced and molten product out of said rotary kiln through said paths when the operation of said rotary kiln is stopped.

13. A method as claimed in claim 8, wherein said rotary kiln comprises a cylindrical shell and an internal refractory layer formed on an internal surface of said shell, said internal refractory layer defining said basin, an intermediate section adjacent to said basin and having an inner diameter smaller than that of said basin, and a gas-solid reaction section isolated by said intermediate section from said basin and having an inner diameter equal to that of said basin the metal melt being, held in said basin by said intermediate section such that the metal melt is prevented from spreading back to said gas-solid reaction section.

14. A method as claimed in claim 8, wherein said rotary kiln has a gas discharge end coupled to a secondary combustion chamber, the method including passing waste gases from said rotary kiln into the second combustion chamber.

15. A method as claimed in claim 1, further comprising the steps of:

preparing slag materials;

mixing said slag materials with said object substance to form a mixture; and feeding said mixture into said rotary kiln to melt said slag materials together with said object substance so that the surface of the metal melt is sufficiently covered with a layer of the slag to be prevented from oxidation.

16. A method as claimed in claim 1, wherein the object substance comprises iron ore dust, steel dust, acid pickling sludge or galvanizing waste sludge.

17. A method as claimed in claim 1, wherein the object substance is mixed with a carbon reductant comprising pulverized coal, coke or other carbon containing material.

18. A method as claimed in claim 17, wherein the carbon reductant is present in an amount of at least two times a stoichiometric amount for reduction of metal oxides in the object substance.

19. A method as claimed in claim 17, wherein the carbon reductant is present in an amount of less than two times a stoichiometric amount for reduction of metal oxides in the object substance.

20. A method as claimed in claim 17, wherein the carbon reductant is present in an amount of 1.2 to 1.5 times a stoichiometric amount for reduction of metal oxides in the object substance.

* * * * *

UNITED STATES PATENT AND TRADEMARK OFFICE
CERTIFICATE OF CORRECTION

PATENT NO. : 5,843,204
DATED : December 1, 1998
INVENTOR(S) : Yoshitaka ISHIKAWA et al It is certified that error appears in the above-identified patent and that said Letters Patent is hereby corrected as shown below:

In Column 13, line 28, after "rotary" and before ";" insert -- kiln --.

Signed and Sealed this

Fifteenth Day of June, 1999

Attest:

Q. TODD DICKINSON

Attesting Officer     Acting Commissioner of Patents and Trademarks